Patented July 4, 1950

2,514,222

UNITED STATES PATENT OFFICE 2,514,222

PREPARATION OF CEMENTS

Robert J. Reid, Canal Fulton, Ohio, assignor to The Firestone Tire & Rubber Company, Akron, Ohio, a corporation of Ohio No Drawing. Application January 28, 1947, Serial No. 724,921

10 Claims. (Cl. 260—29.7)

This invention relates to the preparation of solvent cements of butadiene-acrylonitrile-type elastomers.

Solvent cements of butadiene-acrylonitrile-type elastomers are of considerable technical interest as adhesives and the like. Moreover, such cements provide a convenient means for blending the elastomers with resins such as nitrocellulose, chlorinated rubber, polyvinyl chloride, phenolics and the like. In such blends the elastomers serve as unique, permanent, non-volatile plasticizers, and also impart age resistance, adhesiveness, tenacity and many other desirable properties. Such blended cements may be used as adhesives; as coatings and impregnating agents for fabrics and other web materials; as protective coatings; and as casting solutions for the production of wrapping films and the like.

Cements of natural rubber and of many of the synthetic elastomers are conventionally manufactured by simple power mixing of the rubber or elastomer with an appropriate solvent. Unfortunately, this method is not entirely satisfactory when applied to butadiene-acrylonitrile type elastomers, which must usually be subjected to a rather complicated preliminary break-down-milling schedule in order to obtain satisfactory dispersion in the cement. Even when so prepared, the cements contain numerous clots, gel particles and other discontinuities which interfere with uniform processing of the cements and spoil the appearance of the final products made therefrom. Likewise, such cements tend to gel on storage and to reject many materials which it might otherwise be desirabel to incorporate thereinto. The above defects are particularly disadvantageous in the manufacture of transparent, self-supporting wrapping films from cements comprising butadiene-acrylonitrile-type elastomers and resins such as nitrocellulose, vinyl resins and the like.

Accordingly, it is an object of this invention to provide smooth solvent cements containing butadiene-acrylonitrile-type elastomers.

Another object is to provide such cements which will have improved stability against gelation and phase-separation during storage.

A further object is to provide such cements which will have improved and more stable affinity for resinous and other additive materials.

A still further object is to provide a process for the production of such cements which may be carried out expeditiously, by the use of simple and inexpensive equipment, and under conditions prevailing in manufacturing establishments.

The applicant patentee has discovered that many of the difficulties attendant upon the conventional preparation and use of butadiene-acrylonitrile-type elastomer cements are caused by changes occurring in the elastomers during the oven drying to which they are customarily subjected after coagulation from the latex. Without absolute commitment to this theory, it is thought that the hot air drying causes the formation of local hyper-polymerization and cross-linking of the elastomer. Proceeding from this discovery, the applicant patentee has devised a process for the production of cements of butadiene-acrylonitrile-type elastomers, which process involves coagulation of the latex in which the selected elastomer was originally polymerized; mechanically dewatering the resultant curd as far as is convenient; and dissolving the wet curd in a water-miscible organic solvent which is also a solvent for the elastomer. The resultant cement is brilliantly clear and transparent, smooth, homogeneous, and free from gel particles. The cement has a ready and stable affinity for a wide range of resinous and other additive materials, and yields films, coatings and other finished products of excellent transparency, sparkle and aging properties.

THE BUTADIENE-ACRYLONITRILE-TYPE LATEX

Describing the invention now in greater detail, and referring first to the butadiene-acrylonitrile-type latex constituting the starting material for the practice of this invention, this may be any latex resulting from the copolymerization, in emulsion, of a butadiene-type compound having the formula:

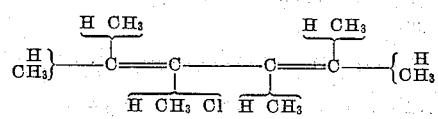

with an acrylonitrile-type compound having the formula:

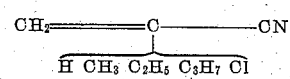

in which formulae each bracket indicates attachment of one of the substituents shown embraced thereby. Suitable butadiene-type compounds are exemplified in butadiene itself, isoprene, chloroprene, 1-methyl-1,3-butadiene-2,3-dimethyl-1,3-butadiene, and the like. Suitable acrylonitrile-type compounds include acrylonitrile itself, methyl acrylonitrile, ethyl acrylonitrile, propyl acrylonitrile, chloroacrylonitrile and the like. The butadiene-type compound may constitute from 10% to 90%, more usually and preferably from about 25% to about 50%, of the weight of the dispersed copolymer, the acrylonitrile-type compound constituting the balance.

The copolymeric latex may be prepared in accordance with any of the known procedures, which generally involve emulsifying the monomers in an aqueous medium containing surface-active agents, catalysts, "modifiers," and the like, and subjecting the emulsion to polymerizing conditions.

By the term "modifiers," used in the preceding paragraph, is understood the various compounds, generally used in the manufacture of butadiene-acrylonitrile elastomers, which direct the copolymerization toward the formation of straight-chain, and to some extent lower molecular weight, products. These "modifiers" are usually sulfur compounds such as mercaptans, disulfides, etc., a classic patent in this field being Wollthan 2,281,613, wherein the "modifiers" are termed "regulating agents." Elastomers produced by the use of modifiers are much more soluble and compatible with other materials than corresponding products produced without the use of modifiers. Somewhat similar effects may be obtained by interrupting the polymerization before completion thereof and adding a stabilizing material, usually termed a "short-stopping agent" to prevent any further polymerization. While latices produced by either or both of these techniques may advantageously be employed in this invention, it is not essential that such special latices be employed. For instance, latices which have been polymerized to rather large degree of conversion, and then simply stripped of monomers without the addition of polymerization-arresting or "short-stopping" agents behave particularly well in film casting operations, see Example V hereinafter. Most conventional latices have had a "short-stopping" agent, such as phenyl β-naphthylamine, added thereto at the end of the polymerization process. Elastomers polymerized without "modifiers" or "short-stopping" agents, and then coagulated and dried in the conventional manner, would be most intractable in such film-casting processes. It will therefore be seen that the process of this invention permits of a greater leeway in the formulation and procedure involved in the original polymerization, which leeway is often very desirable in adapting the copolymers for special uses. It is, of course, not intended to disparage the use of conventionally-prepared copolymer latices, which also function very well in the process of this invention.

COAGULATION OF THE LATEX

Coming now to the process of coagulating the butadiene-acrylonitrile-type latex preliminary to dissolving the curd, the coagulation may be effected by any suitable means, for instance the addition to the latex of electrolytes such as potassium aluminum sulfate, aluminum sulfate, sodium chloride, acids (in the case of anionic-emulsifier-stabilized latices), bases (in the case of cationic-emulsifier-stabilized latices), and the like; addition of water soluble organic solvents, such as methanol, ethanol, glycol, glycerol, methyl ethyl ketone, acetone, and the like, which have the advantage, over the electrolyte coagulants, of not introducing salts, emulsifying agent residues, etc. into the curd; electrophoresis; freezing; subjection to ultrasonic vibrations; and, in the case of latices prepared with a minimum of emulsion stabilizing agents, extremely vigorous agitation. After the coagulation step, the curd is mechanically separated from the bulk of the serum by any appropriate dewatering means, as by filtration, centrifugation, pressing, passage through a straining screw press, etc. The dewatered curd is preferably washed, as by re-slurrying the water and re-dewatering, in order to remove vestiges of emulsifying agents, catalysts, etc. which may have been carried over from the polymerization step. The final dewatering may very conveniently be performed on a roll mill, preferably one provided with a fluted roll, such as a washing mill. The water content of the curd should be reduced as far as may be convenient in view of the circumstances under which the process is practiced, for instance to about 60%, or even better, to below about 30%, based on the total weight of curd and entrained water, before the step of dissolving the wet curd in the water-dissolving organic solvent is attempted.

DISSOLVING THE CURD

The dissolving of the wet curd may be effected in any organic solvent which is capable (1) of dissolving minor proportions of water (by way of illustration, about 1% based on the total weight of water and of solvent) and (2) of forming a satisfactory cement of the butadiene-acrylonitrile-type elastomer. Suitable solvents will therefore be seen to include, for instance, ketone solvents on the order of acetone, methyl ethyl ketone and methyl isopropyl ketone; ester solvents on the order of ethyl acetate, butyl acetate, methyl butyrate, butyl formate and the like; dioxane, dioxolane and similar miscellaneous solvents; and mixtures of the various solvents above indicated as being suitable. Solvents for the elastomer which are incapable of dissolving water, such as the chlorinated hydrocarbons, and non-solvent diluents, such as the aromatic solvents, may be used in admixture with the water-miscible solvents, particularly if such non-water-dissolving solvents and diluents are not added until after the initial stages of the solution of the elastomer.

The physical operation of dissolving the elastomer curd in the solvent consists of vigorously agitating the wet curd and solvent together, preferably with at least local concentrated shearing action. Preferably, the solvent is added portionwise to insure maximum viscosity and shear in the dissolved phase, and to avoid lumping. Suitable apparatus for carrying out this portion of the process include (for small scale preparations) the Waring Blendor; the Werner-Pfleiderer mixer; the Baker-Perkins mixer; the common turbo-mixer; and any other apparatus capable of vigorously agitating the mass, preferably with at least local powerful shearing action. As noted above, the solvent employed in the initial stages of the dissolving step should consist largely of a water-dissolving, true solvent for the elastomer; however, after the initial formation of the dough or cement, the solvent may be diluted to a considerable extent with non-water-dissolving solvents and mere diluents.

It should be noted at this point that the unit operation of dissolving the wet butadiene-acrylonitrile-type elastomer curd in accordance with this invention may be effected with comparative ease and with a minimum expenditure of time and power. This is in distinct contrast to the behavior of commercial dried elastomers, which require powerful and long continued mixing to effect solution.

Cements prepared in accordance with this invention will ordinarily contain small percentages of water carried over by entrainment with the wet curd, which small percentages will be unobjectionable in most cases. Removal of this water for special application may be accomplished by distilling the water out, the solvent removed during the distillation being made up, if necessary, by introduction of additional solvents. Cements dehydrated in this way will tolerate very much larger quantities of non-water-dissolving solvents than cements containing the water introduced via the wet curd.

PROPERTIES AND USES OF THE CEMENTS

The cements prepared in accordance with this invention, in contrast to those prepared by conventional processes, are clear and substantially free from inhomogeneities such as gel particles, etc. The cements are stable over extended periods of time, and stably retain various desirable additives, particularly resinous materials such as vinyl resins, chlorinated rubber, chlorinated polyethylene, cellulose nitrate, and the like. This last feature, particularly in association with the clarity and homogeneity of the cements, is of great value in the preparation of clear films and coatings of resins blended with butadiene-acrylonitrile-type elastomers.

With the foregoing general discussion in mind, there are given herewith detailed examples of the practice of this invention. All proportions given are by weight.

EXAMPLE I

| | Parts |
|---|---|
| Butadiene-acrylonitrile copolymer latex (containing 28% of a dispersed copolymer containing 45% acrylonitrile: polymerized in the presence of a "modifier" and polymerization arrested by addition of a "short-stopping" agent) [1] | 367 |
| Alum solution (0.5% solution in water) [2] | 20 |
| Methyl ethyl ketone | 560 |

[1] "Modifier" was dodecyl mercaptan; "short-stopping" agent was phenyl β-naphthylamine. Both employed to the extent of 1.0%, based on the weight of monomers.
[2] "Alum" used was a commercial partially hydrated aluminum sulfate containing 17.5% $Al_2O_3$; "0.5%" refers to the hydrated material.

The copolymer latex was vigorously stirred and the alum solution slowly added. The resultant curd was separated from the serum by filtration, and repeatedly washed with water upon the filter. The cake was then pressed in a cloth bag until the water content thereof was reduced to about 30%.

The wet curd was then placed in a high speed mixer, and the methyl ethyl ketone added in small portions over a period of 30 minutes, with continuous powerful agitation. The resultant cement was clear, transparent, free from gel particles and uniform in texture. The cement was stable for extended period of storage under ordinary warehousing conditions. The cement was highly satisfactory as an adhesive, and was capable of dissolving phenolic, polyacrylate, vinyl and other resins to produce blended cements useful as adhesives, film forming compositions, coatings and the like.

EXAMPLE II

A

| | Parts |
|---|---|
| Vinyl chloride resin (copolymer of approximately 90% vinyl chloride with 10% of vinylidene chloride: "Koron 202," a product of The B. F. Goodrich Company) | 56 |
| Methyl ethyl ketone (1st portion) | 333 |

B

| | Parts |
|---|---|
| Methyl ethyl ketone (2nd portion) | 195 |
| Latex of butadiene-acrylonitrile copolymer (25% solids content: copolymer contains 45% acrylonitrile, "modified" during polymerization and polymerization arrested by addition of a "short-stopping agent" as in Example I) | 181 |
| Xylene | 139 |

The above schedule provides a total of 100 parts of resin and elastomer, amounting to 15% by weight of the solvents.

The vinyl chloride resin and first portion of the methyl ethyl ketone were subjected to high speed mixing at 70° C. for 2 hours, resulting in the formation of a smooth cement A. In the meantime the latex was coagulated by the addition of a small amount of alum, and the coagulum was carefully washed and pressed to dewater it to a moisture content of 22%. The coagulum was then agitated and dissolved in a mixture of the second portion of the methyl ethyl ketone and the xylene, and the resultant solution B was mixed with cement A. The resultant solution was then filtered and cast to a depth of .01" on the casting belt of a film casting machine, dried, and stripped off to yield a film .001" thick. The resultant film was sparklingly clear, transparent, flexible, strong and inelastically extensible—in general, being admirably adapted as a wrapping and packaging film. The film retained these properties over extended periods of time and under adverse conditions of exposure and use.

EXAMPLE III

| | Parts |
|---|---|
| Butadiene-acrylonitrile copolymer latex (containing 25% of a dispersed copolymer containing 25% acrylonitrile: not "modified" during polymerization) | 400 |
| Methanol | 20 |
| Ethyl acetate | 2000 |

The copolymer latex was vigorously agitated, and the methanol slowly added to effect coagulation. The coagulum was separated by filtration and pressed to reduce the water content to 18%. The wet curd was then placed in an agitating apparatus, and the ethyl acetate slowly added with application of vigorous agitation. There resulted a clear solution or cement of the butadiene-acrylonitrile copolymer. This cement was useful for all the purposes heretofore enumerated. By way of example, a cotton fabric sheeting 68 x 74 count, 5 oz. per sq. yard, was impregnated with the solution and dried. The resultant proofed fabric was ideally suited as a water- and oil-resistant sheeting for surgical and other uses.

EXAMPLE IV

| | Parts |
|---|---|
| Cement prepared as described in Example I | 100 |
| Phenolic resin ("Durez 7031" a phenol formaldehyde resin prepared by Durez Plastics & Chemicals Inc.) | 20 |

The phenolic resin was dissolved in the cement by high speed agitation. The resultant composite cement had excellent shelf life, being stable against gelation and phase separation, and formed adhesive bonds with a wide variety of substances.

EXAMPLE V

*Preparation of elastomer*

| | Parts |
|---|---|
| Butadiene | 55 |
| Acrylonitrile | 45 |
| Dodecyl mercaptan | 0.5 |
| Sodium oleate | 5 |
| Potassium persulfate | 0.9 |
| Water | 210 |

It will be noted that the dodecyl mercaptan in the above recipe is insufficient to serve as a "modifying agent" essential to the production of a rubbery product suitable for ordinary purposes. It will also be noted that no short-stop agent is employed.

The sodium oleate, dodecyl mercaptan and potassium persulfate were dissolved in the water, and the solution introduced into a closed polymerizer provided with a rotary agitator. The butadiene and acrylonitrile were then introduced, and the temperature adjusted to 36° C. Agitation and polymerization were carried on for 10 hours, at the end of which time the unreacted monomers were simply blown off and swept out of the polymerization mass with steam. No short-stopping agent or other material calculated to arrest the polymerization or stabilize the polymer was added. The resultant latex was set aside for use in making filming cements, as will now be described.

*Preparation of films*

The procedure of Example II was precisely repeated, using all of the same ingredients with the exception that the latex prepared as described in the preceding paragraph was substituted for the conventional latex employed in Example II. The coagulated curd was crumbly, rather than tacky and rubbery, and lent itself admirably to the dissolving step. The casting cement behaved in a far superior manner in the casting process, having a very advantageous fluidity and drying out rapidly and smoothly to form a clear, homogeneous film. A butadiene-acrylonitrile elastomer prepared without modifiers or short-stopping agents as above described, and dried out in the conventional manner before attempting the formation of a cement, would be completely intractable in the film forming process.

EXAMPLE VI

| | Parts |
|---|---|
| Butadiene-methacrylonitrile copolymer latex (containing 20% of a dispersed copolymer containing 35% methacrylonitrile, polymerized in the presence of a modifier, "short-stopping" agent added at conclusion of polymerization as in Example I) | 500 |
| Methanol | 20 |
| Methyl ethyl ketone | 1000 |

The latex was rapidly stirred, and the methanol added to coagulate the copolymer. The curd was separated from the serum by filtration, and washed twice with water on the filter. The washed curd was then pressed between filter papers to reduce the water content thereof to 30%. The washed curd was then dissolved with agitation in the methyl ethyl ketone, yielding a smooth, particle-free cement having the same excellent properties characterizing the cements prepared as described in the other examples.

From the foregoing general disclosure and detailed formal examples, it will be evident that this invention provides novel cements of acrylonitrile-type elastomers which are homogeneous, clear, and stable, and which lend themselves to industrial processing. The cements are readily and stably compatible with a wide variety of desirable additive resins and other materials to provide compositions suitable as adhesives, protective coatings, film casting cements, textile fabric and other web material coatings and impregnating agents, and the like. The process may be carried out expeditiously, and with minimum expenditure of skilled labor and equipment. The process moreover makes possible the use of specially prepared elastomers having particular advantages in the casting of films and the like, which specially prepared elastomers would be completely intractable in ordinary cement-forming processes.

What is claimed is:

1. Process which comprises coagulating, from the latex in which it was polymerized, a copolymer of a compound having the formula:

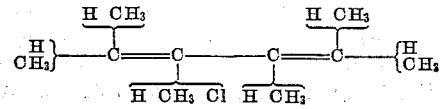

with from 10% to 45%, based on the total weight of copolymerized compounds, of a compound having the formula:

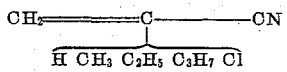

in which formulae each bracket indicates the attachment of a substituent selected from the group of substituents consisting of those shown embraced thereby, mechanically dewatering the coagulated copolymer and dissolving the wet copolymer in an organic solvent capable of dissolving at least 1% of water.

2. Process which comprises coagulating, from the latex in which it was polymerized, a copolymer of butadiene with from 10% to 45%, based on the total weight of copolymerized compounds, of acrylonitrile, mechanically dewatering the coagulated copolymer and dissolving the wet copolymer in an organic solvent capable of dissolving at least 1% of water.

3. Process which comprises coagulating, by addition of methanol, from the latex in which it was polymerized, a copolymer of a compound having the formula:

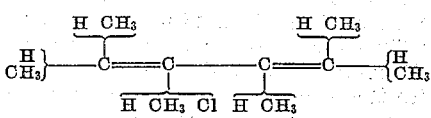

with from 10% to 45%, based on the total weight of copolymerized compounds, of a compound having the formula:

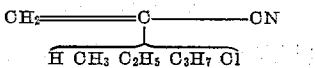

in which formulae each bracket indicates the attachment of a substituent selected from the group of substituents consisting of those shown embraced thereby, mechanically dewatering the coagulated copolymer and dissolving the wet copolymer in an organic solvent capable of dissolving at least 1% of water.

4. Process which comprises coagulating, by addition of a water soluble salt, from the latex in which it was polymerized, a copolymer of a compound having the formula:

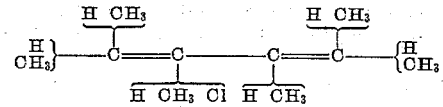

with from 10% to 45%, based on the total weight of copolymerized compounds, of a compound having the formula:

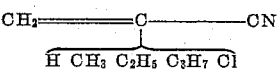

in which formulae each bracket indicates the attachment of a substituent selected from the group of substituents consisting of those shown embraced thereby, mechanically dewatering the coagulated copolymer and dissolving the wet copolymer in an organic solvent capable of dissolving at least 1% of water.

5. Process which comprises coagulating, from the latex in which it was polymerized, a copolymer of a compound having the formula:

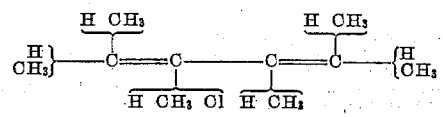

with from 10% to 45%, based on the total weight of copolymerized compounds, of a compound having the formula:

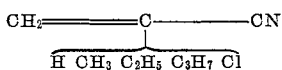

in which formulae each bracket indicates the attachment of a substituent selected from the group of substituents consisting of those shown embraced thereby, said copolymer having been produced without the addition of a short-stopping agent at the conclusion of the polymerization step, mechanically dewatering the coagulated copolymer, and dissolving the wet copolymer in an organic solvent capable of dissolving at least 1% of water.

6. Process which comprises coagulating, from the latex in which it was polymerized, a copolymer of butadiene with from 10% to 45%, based on the total weight of copolymerized compounds, of acrylonitrile, mechanically dewatering the coagulated copolymer and dissolving the wet copolymer in methyl ethyl ketone.

7. Process which comprises coagulating, from the latex in which it was polymerized, a copolymer of butadiene with from 10% to 45%, based on the total weight of copolymerized compounds, of acrylonitrile, said copolymer having been produced without the addition of a short-stopping agent at the conclusion of the polymerization step, mechanically dewatering the coagulated copolymer and dissolving the wet copolymer in an organic solvent capable of dissolving at least 1% of water.

8. A solution, in a solvent capable of dissolving at least 1% of water, of a copolymer of a compound having the formula:

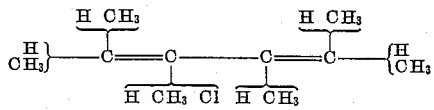

with from 10% to 45%, based on the total weight of copolymerized compounds, of a compound having the formula:

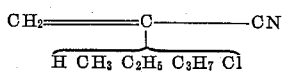

in which formulae each bracket indicates the attachment of a substituent selected from the group of substituents consisting of those shown embraced thereby, said solution having been prepared by the process of claim 1.

9. A solution, in a solvent capable of dissolving at least 1% of water, of a copolymer of butadiene with from 10% to 45%, based on the total weight of copolymerized compounds, of acrylonitrile, said solution having been prepared by the process of claim 2.

10. A solution, in a solvent capable of dissolving at least 1% of water, of a copolymer of a compound having the formula:

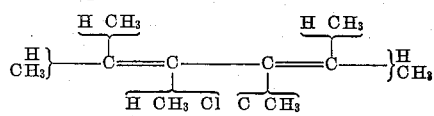

with from 10% to 45%, based on the total weight of copolymerized compounds, of a compound having the formula:

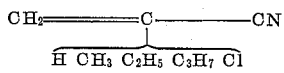

in which formulae each bracket indicates the attachment of a substituent selected from the group of substituents consisting of those shown embraced thereby, said copolymer having been prepared in the absence of modifying agents during polymerization and of short-stopping agents at the conclusion of polymerization, said solution having been prepared by the process of claim 5.

ROBERT J. REID.

REFERENCES CITED

The following references are of record in the file of this patent:

UNITED STATES PATENTS

| Number | Name | Date |
|---|---|---|
| 2,325,984 | Sarbach | Aug. 3, 1943 |
| 2,445,727 | Kinzinger | July 20, 1948 |
| 2,459,739 | Groten et al. | Jan. 18, 1949 |

OTHER REFERENCES

Rubber Industry, vol. 15, June 1939, article on Buna by Stocklin (page 56).